Aug. 26, 1958     G. PIGEON     2,848,992

APPARATUS FOR CONTROLLING THE PULSE

Filed Aug. 30, 1955     2 Sheets-Sheet 1

INVENTOR
GERARD PIGEON
By Young, Emery & Thompson
ATTYS.

Aug. 26, 1958

G. PIGEON 2,848,992

APPARATUS FOR CONTROLLING THE PULSE

Filed Aug. 30, 1955

INVENTOR
GERARD PIGEON
By Young, Emery & Thompson
ATTYS.

United States Patent Office 2,848,992
Patented Aug. 26, 1958

2,848,992

APPARATUS FOR CONTROLLING THE PULSE

Gérard Pigeon, Paris, France

Application August 30, 1955, Serial No. 531,387

Claims priority, application France September 15, 1954

3 Claims. (Cl. 128—2.05)

The knowledge and the watch of the pulse have a peculiar importance for the control of the biologic state of patients.

As a matter of fact, if the number of throbbings per minute goes out of a band of frequencies, determined for each patient, this phenomenon results from a modification of the state of the patient and an intervention may be necessary.

The present invention concerns an apparatus performing under a small volume a control of the pulse, of indefinite duration, without causing any trouble to the patient.

According to the invention, the apparatus for watching and controlling the pulse comprises a detecting and amplifying device which produces at each throbbing an electric signal, transmitted to an integrator feeding a measuring instrument, preferably graduated in pulse frequencies and provided with a comparator, which may be adjusted for at least a predetermined value of frequency, and which actuates at least a warning device in case of overpassing the said predetermined value of frequency.

Thus when the result of the measure is in a forbidden zone (under the exigible minimum or above the due maximum for instance) this phenomenon is detected by the comparator which actuates the warning signal, so as to occasion the desirable intervention.

Preferably the detecting apparatus is analogous to that of the electrocardiographs.

Figure 1:
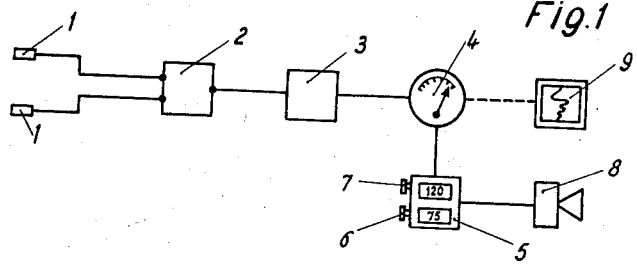
Fig. 1 is a theoretical schematic view of an apparatus according to the invention.

As shown in Fig. 1, the apparatus essentially comprises a detecting device constituted by two electrodes 1 intended to be fastened on the body of the patient in two points relatively remote from each other (two arms or an arm and a leg for instance). The electrodes 1 are connected to an amplifying electronic stage 2 which emits at each throbbing characteristic electric impulses, which are at once transferred to an integrator 3 to which a device 4 for measuring the frequency is adjoined. This latter is combined with a comparator 5, on that two values of the frequency of the pulse may be chosen as references; one of these values corresponds to the exigible minimum: 75 throbbings per minute for instance (adjustment made by means of the knob 6), the other value corresponds to the due maximum: 120 throbbings per minute for instance (adjustment being made by means of the knob 7).

The comparator actuates a warning device 8; the actuation of this device depends on the position of the measure, continuously given by the apparatus, relatively to both limits. A registering apparatus 9 may be also adjoined to the unit.

The operation of the device is easily understood. The impulses transferred to the integrator 3 are transformed into a signal of mean value, the intensity of which depends only on the frequency of these impulses, and is independent from the shape of these impulses.

Figure 2:
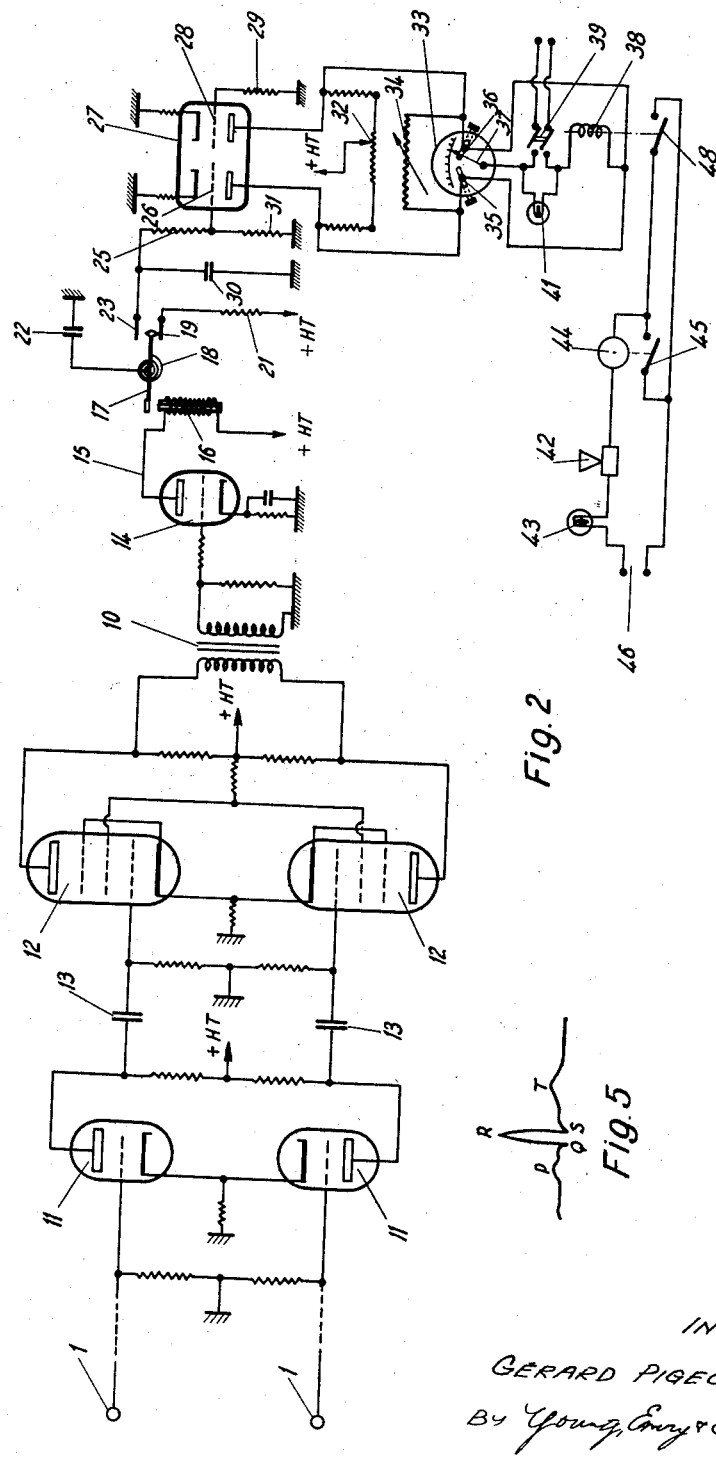
Fig. 2 is a simplified diagram showing the connections in a peculiar embodiment.

In the embodiment of Fig. 2 the amplifier used belongs to the symmetrical type and is, for instance, analogous to those used in the electrocardiographs. It has two amplifying stages 11 and 12 connected by capacities 13. Such an amplifier which is fed under a high tension, equal for instance to 500 volts, is computed in such a manner that its response curve corresponds to the quick wave QRS (Fig. 5) of the characteristic wave PQRST of the potential difference between both electrodes at each heart contraction, the profile of this wave being known by the usual electrocardiographs. Such a wave has a duration which varies according to persons from 4 to 1 hundredths of a second.

The time constants of the circuits of the amplifier 2 are computed so as to admit the slow waves P and T. The final stage of the amplifier 2 is connected by a transformer 10 to an amplifying tube 14 of which the plate-circuit 15 feeds an electromagnet 16 which belongs to the integrator 3.

This integrator comprises also a switch with a movable blade 17 actuated by an electromagnet 16 and normally maintained by a spiral spring 18 in contact with the touch 19 which is connected through the resistance 21 to a high tension source supposed to be stabilised. The movable blade 17 is permanently connected to a capacity 22 of a small value and may come into contact with a second touch 23. This latter is connected on the one hand to a capacity 30 of a high value relatively to the capacity 22 and on the other hand to a resistance 25 which is connected to one of the grids 26 of a double triode 27. The other grid 28 of this double triode and the said grid 26 are polarized respectively by the resistances 29 and 31, the values of which are equal.

The plate feeding of the tube 27 comprises a potentiometer 32, while a galvanometer 33 is connected as a bridge between both plate-circuits, and is shunted by an adjustable resistance 34.

The galvanometer 33 is the measuring instrument of the unit and its dial is graduated in members of throbbings per minute (for example 0 to 200).

The comparator adjoined to the galvanometer 33 comprises two adjustable contacts 35 and 36 which may be closed by the hand 37 of the galvanometer. The releasing circuits of the warning device are connected with the hand 37 and touches 35 and 36. These circuits essentially comprise a driving electromagnet 38, a feeding switch 39 and a luminous indicator 41, which shows whether the hand 37 is under tension. The alarm circuit comprises a sonorous warning device 42, a luminous warning device 43, a relay 44 producing the closing of the autofeeding contact 45, a source of current 46 and, in series with the elements 42, 43, 44 and 46, a contact 48 of which the closing is produced by the relay 38.

Figure 5:
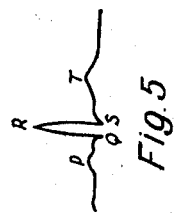
Fig. 5 is an explanatory diagram.

The operation of the apparatus is as follows:

At each throbbing, the electrodes 1 transfer to the differential amplifier comprising the tubes 11 and 12 an electric wave analogous to that shown in Fig. 5. The tubes 12 deliver to the transformer 10 a signal corresponding to the part QRS of the wave. This signal amplified by the tube 14 which operates as a current amplifier energizes the electromagnet 16. This latter attracts the movable blade 17 of the switch and this blade comes into contact with the touch 23. Consequently the capacity which had been charged through the resistance 21 and of the touch 19 is discharged in the capacity 30 which is of a higher value.

Thus the capacity 22 is charged between two throbbings and it is discharged at each throbbing. Of course the values of the resistance 21, and of the capacity 22 are computed so as the time of charge be lower than the shortest time interval between two throbbings. Similarly inertia of the commutation blade 17 must be foreseen accordingly.

The condenser 30 of high capacity which periodically receives a constant charge from the capacity 22 and is continuously discharged into the resistances 23 and 31 is maintained at a potential which depends only on the frequency of the pulse. Particularly, this potential depends neither on the intensity of the entrance signal QR, nor on the gain of the amplifying tube 14. The single condition to be verified by this mounting is that the intensity delivered at each signal to the electromagnet 16 be sufficient to ensure the attraction of the movable blade 17.

The tube 27 amplifies the potential difference between both grids 26 and 28 and the amplified potential difference is continuously measured by the galvanometer 33. The zero adjustment of this galvanometer is made by means of the potentiometer 32, while the shunt resistance 34 permits to make a suitable graduation of the galvanometer.

When the apparatus is under tension, the electrodes 1 being fastened on the patient, the switch 39 is off till the hand 37 of the galvanometer reaches a position of stable equilibrium. The switch 39 is then closed, what lights up the luminous indicator 41. If at this time the pulse of the patient falls under the exigible minimum or increases above the due maximum, the variations of the charge of the capacity 30 are such that the hand 37 comes into contact with the movable touches 33 or 36. At this time the relay 38 is energised, it closes the contact 48, and that energises the relay 44, which closes the contact 45. The warning devices 42 and 43 are thus permanently actuated. To stop their action, it is sufficient to cut off the feeding coming from the source 46. Of course, in addition to the alarm devices, therapeutic intervention apparatus (for instance oxygen bottles) may be servo-controlled by the contact 48.

As the apparatus according to the invention is easily constructed and mounted, it may be executed so as to permit its transport, for instance in a box 51 provided with a handle 52.

In this case transistors which occupy a very small volume and spend a very low current may be advantageously substituted to electronic tubes. The feeding is performed by a high tension battery 53 and by a low tension battery 54, this latter serving together the comparator and the trembler bell which constitutes the alarm device.

Figure 3:
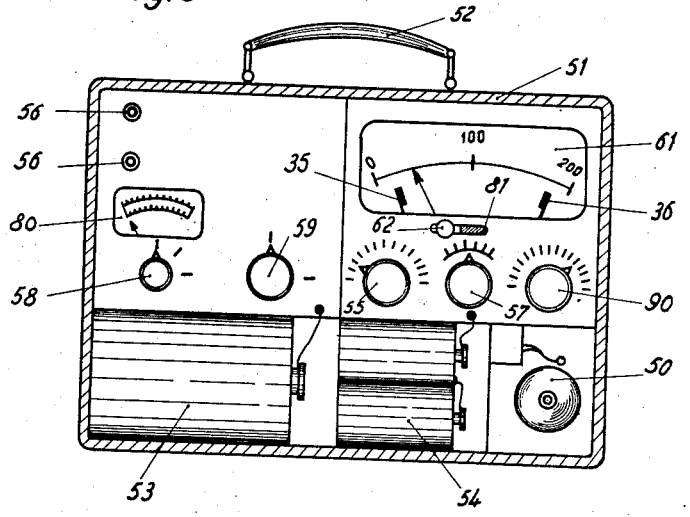
Fig. 3 shows, seen from outside, an embodiment in which the apparatus is portable.

Fig. 3 shows also the jacks 56 for introduction of plugs connected to the electrodes 1, and the dial 80 of a voltmeter with two sensibilities, the first one for controlling the battery 53, the second one for controlling the battery 54. The commutation of this voltmeter is made by means of a knob 58 of which the zero position corresponds to the case when the voltmeter is disconnected. The general interrupter is shown in 59.

Besides 61 represents the dial of the galvanometer 4 graduated in numbers of throbbings per minute, 35 and 36 are the touches, of which the position is adjustable by means of knobs 55 and 90; 57 is the knob which actuates the potentiometer 32 shown Fig. 2 for zero adjustment of the galvanometer.

The switch 62 of the battery 54 is solidary of a control indicator 81 which is intended to replace the luminous signal 41 of Fig. 2.

Figure 4:
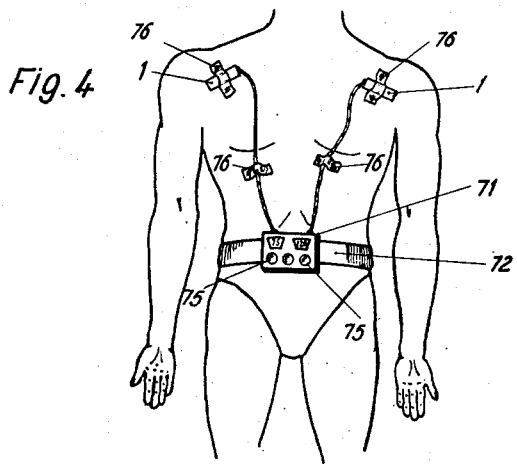
Fig. 4 represents the apparatus placed on a patient.

Fig. 4 represents another form of execution, in which the apparatus constructed with very reduced dimensions, is enclosed in a box 71 attached to the patient by a belt 72. This box which contains the feeding and alarm devices as that of Fig. 3 has no measure dial visible outside, the comparator being entirely in the box 71.

The control of switches and the adjustment of limits are made by means of a removable key which is at the disposal of the surgeon and which he may introduce into apertures 75 foreseen for that purpose. The electrodes 1 are constituted in this case by rectangular metallic plates fixed in front of the clavicle by gummed bands 76.

The apparatus thus executed is very flat. It may be permanently left on the patient, for instance during the night and without any inconvenience for the bearer. As no driving part is protuberant, no disturbance of adjustment is to be feared.

The apparatus according to the invention may be used for many applications and it may be produced by industry in mass.

It is well understood that the invention is not limited to the forms of execution which have been described and that they may receive secondary modifications. For instance, in the integrator represented in Fig. 2, it is evident that the function of touches 19 and 23 combined with the movable blade 17 might be exchanged. Besides comparators of any types may be used to reveal the discrepancy of the instantaneous value of the pulse relatively to fixed limits.

I claim:

1. Apparatus for automatically watching and controlling the pulse of a patient, said apparatus comprising in combination means for producing an electric signal at each throbbing, said means comprising two electrodes intended to be fastened in two different parts of the patient's body and an electronic amplifier connected to said electrodes, an integrator circuit, said circuit comprising a capacity, a discharge resistance connected to said capacity and means for charging said capacity at each throbbing, a measuring instrument graduated in frequencies fed by said integrator circuit, means for comparing the frequency measured by said instrument with two adjustable values, corresponding respectively to the minimum exigible frequency and to the maximum permissible frequency of the pulse, and a warning device controlled by said comparing means.

2. Apparatus for automatically watching and controlling the pulse of a patient, said apparatus comprising in combination means for producing an electric signal at each throbbing, said means comprising two electrodes intended to be fastened in two different parts of the patient's body, an electronic amplifier connected to said electrodes, a relay energized by said amplifier at each throbbing, said apparatus comprising also an integrator circuit comprising a capacity, a discharge resistance connected to said capacity, means for charging said capacity at each throbbing, said charging means comprising an auxiliary capacity of smaller value, a current source and means for alternately connecting said auxiliary capacity to said current source and to said first-cited capacity, said connecting means comprising a switch actuated by said relay, said apparatus comprising also a measuring instrument graduated in frequencies fed by said integrator circuit, means for comparing the frequency measured by said instrument with two adjustable values, corresponding respectively to the minimum exigible frequency and to the maximum permissible frequency of the pulse, and a warning device controlled by said comparing means.

3. Apparatus for automatically watching and controlling the pulse of a patient, said apparatus comprising in combination means for producing an electric signal at each throbbing, said means comprising two electrodes intended to be fastened in two different parts of the patient's body, an electronic amplifier connected to said electrodes, a relay energized by said amplifier at each throbbing, said apparatus comprising also an integrator circuit comprising a capacity, a discharge resistance connected to said capacity, means for charging said capacity at each throbbing, said charging means comprising an auxiliary capacity of smaller value, a current source and means for alternately connecting said auxiliary capacity to said current source and to said first-cited capacity, said connecting means comprising a switch actuated by said relay, said apparatus comprising also a measuring instrument graduated in frequencies fed by said integrator circuit, means for comparing the frequency measured by said instrument with two adjustable values, said comparing means comprising two adjustable contacts controlled by said measuring instrument corresponding respectively to the minimum exigible frequency and to the maximum permissible frequency, a warning device, a circuit controlling said device, said circuit comprising said adjusable contacts parallelly mounted.

References Cited in the file of this patent

UNITED STATES PATENTS 2,439,495     Sturm _____ Apr. 13, 1948

OTHER REFERENCES

A Continuous Electronic Pulse-Rate Indicator and Recorder, Schwarzschild and Shelesnyak, Rev. Sci. Inst., November 1942. (Copy in Div. 55, pages 496–501.)